(12) United States Patent
Norton et al.

(10) Patent No.: US 10,434,659 B2
(45) Date of Patent: Oct. 8, 2019

(54) SYSTEMS, DEVICES, ARTICLES, AND METHODS FOR USER INPUT

(71) Applicant: Kindred Systems Inc., Vancouver (CA)

(72) Inventors: Olivia S. Norton, Vancouver (CA); Maxwell Burgess Bennett, Boston, MA (US)

(73) Assignee: Kindred Systems Inc., San Francisco, CA (US)

( * ) Notice: Subject to any disclaimer, the term of this patent is extended or adjusted under 35 U.S.C. 154(b) by 189 days.

(21) Appl. No.: 15/446,685

(22) Filed: Mar. 1, 2017

(65) Prior Publication Data

US 2017/0255301 A1 Sep. 7, 2017

Related U.S. Application Data

(60) Provisional application No. 62/302,575, filed on Mar. 2, 2016.

(51) Int. Cl.
| | |
|---|---|
| *B25J 13/02* | (2006.01) |
| *G06F 3/01* | (2006.01) |
| *G06F 3/02* | (2006.01) |

(52) U.S. Cl.
CPC ............ *B25J 13/025* (2013.01); *B25J 13/02* (2013.01); *G06F 3/011* (2013.01); *G06F 3/014* (2013.01); *G06F 3/0219* (2013.01)

(58) Field of Classification Search
CPC ............ A61B 5/4528; A61H 2201/165; A61H 9/0078; B25J 13/02; B25J 13/025

USPC ...... 700/245, 45, 83, 96; 715/701, 702, 757; 703/3, 11

See application file for complete search history.

(56) References Cited

U.S. PATENT DOCUMENTS

| | | | |
|---|---|---|---|
| 5,045,842 A | 9/1991 | Galvin | |
| 5,515,044 A | 5/1996 | Glatt | |
| 2010/0168620 A1* | 7/2010 | Klimovitch | ............ A61B 5/042 600/587 |
| 2016/0202134 A1* | 7/2016 | Malackowski | ......... G01L 5/226 73/862.05 |
| 2016/0243701 A1 | 8/2016 | Gildert et al. | |
| 2017/0066128 A1 | 3/2017 | Gildert | |

OTHER PUBLICATIONS

Brooks et al., "Hand Controllers for Teleoperation : A State-of-the-Art Technology Survey and Evaluation," NASA Jet Propulsion Laboratory, Pasadena, CA, 1985, 97 pages.

Cleary et al., "Push Technology—The Computer Meets the FSR," *Proceedings of the NACCQ*, Napier, New Zealand, Jul. 2001, pp. 243-248.

(Continued)

*Primary Examiner* — Dalena Tran
(74) *Attorney, Agent, or Firm* — Seed IP Law Group LLP

(57) ABSTRACT

An operator interface that may be in communication with at least one processor, or at least one robot. The operator interface includes a body defined, in part, by an outer surface shaped to receive a hand of an operator, and a plurality of sensors overlying the outer surface of the body. In response to inward force exerted by the operator, the force sensors produce a plurality of input signals. The input signals represent information that may be used to guide the at least one robot in an environment or an avatar in a virtual world.

20 Claims, 11 Drawing Sheets

(56) References Cited

OTHER PUBLICATIONS

Hall, "Design of a Force-Sensing Glove for Ergonomic Evaluation," Master's Thesis, Simon Fraser University, Burnaby British Columbia, Canada, Apr. 2000, 123 pages.
Hall et al., "A technique for conditioning and calibrating force-sensing resistors for repeatable and reliable measurement of compressive force," *Journal of Biomechanics* 41:3492-3495, 2008.
Heo et al., "Current Hand Exoskeleton Technologies for Rehabilitation and Assistive Engineering," *International Journal of Precision Engineering and Manufacturing* 13(5):807-824, 2012.
Interlink Electronics, "FSR 400 Data Sheet," downloaded from www.interlinkelectronics.com, 4 pages, 2010.
Kheddar, "Teleoperation Based on the Hidden Robot Concept," *IEEE Transactions on Systems, Man, and Cybernetics—Part A: Systems and Humans* 31(1): 13 pages, 2001.
Kong et al., "Optimal cylindrical handle diameter for grip force tasks," *International Journal of Industrial Ergonomics* 35:495-507, 2005.
Sensitronics LLC, "FSR 101 Force Sensing Resistor Theory and Applications," downloaded from http://sensitronics.com/pdf/Sensitronics_FSR_101.pdf, 2016, 15 pages.
Tekscan, "Flexiforce® Standard Force & Load Sensors Model # A401," Tekscan, Inc., document, Rev:C_2811, 2011, 1 page.

\* cited by examiner

SYSTEMS, DEVICES, ARTICLES, AND METHODS FOR USER INPUT

BACKGROUND

Technical Field

This disclosure generally relates to the field of user interface devices.

Description of the Related Art

User Interfaces

A user interface device a component of a processor based device, for example, a computer, that interacts with a human operator. User interface devices can be integrated with, or be peripheral to, the processor based device. Using a user interface the human operator provides information, data, or control signals to one or more processor based devices. In contrast, output devices, allow one or more processor based devices to provide information, or data to humans, for example, the human operator.

Pointing Device

A pointing device is a machine or apparatus that allows a user to provide input to a computer using movements or gestures, e.g., point, click, and drag. A common example of which is a hand-held mouse where movement across a tangible surface is replicated by movements of a cursor in a display.

BRIEF SUMMARY

A manufacture for inclusion in a user interface device including a first tubular body including an outer surface, a first force sensor overlying the outer surface of the first tubular body at a first location, and a second force sensor overlying the outer surface of the first tubular body at a second location opposed to the first location.

A robotic system including at least one processor, and a robot communicatively coupled to the at least one processor. The robotic system further including an operator interface communicatively coupled to the at least one processor and the robot. The operator interface includes a tubular body defined in part by an outer surface to receive a hand of an operator, and a plurality force sensors overlying the outer surface of the tubular body which are responsive to an inward force exerted by the hand of the operator produces a plurality of input signals, and wherein a pair of force sensors of the plurality force sensors are spaced apart and opposed to receive a thumb and a finger of the operator. The robotic system further including at least one non-transitory computer-readable storage medium communicatively coupled to the at least one processor and which stores processor-executable instructions thereon. The processor-executable instructions when executed cause the at least one processor to receive the plurality of input signals, create robot control instructions which when executed by the robot, cause the robot to simulate at least one action taken by the operator, and produce at least one signal that represents the robot control instructions.

A user interface device may be summarized substantially as described and illustrated herein.

A system may be summarized as including a user interface device and a robot substantially as described and illustrated herein.

A system may be summarized as including a user interface device and a processor based device substantially as described and illustrated herein.

A method of operation of a control device may be summarized substantially as described and illustrated herein.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings. Systems, devices, articles, and methods are described in greater detail herein with reference to the following figures in which.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with user interfaces and/or robotics, such as processors, sensors, storage devices, and network interfaces, have not been shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one", "an", or "another" applied to "embodiment", "example", means that a particular referent feature, structure, or characteristic described in connection with the embodiment, example, or implementation is included in at least one embodiment, example, or implementation. Thus, the appearances of the phrases "in one embodiment", "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the user forms "a", "an", and "the" include plural referents unless the content clearly dictates otherwise. Thus, for example, reference to a problem-solving system including "a computer server" includes a single computer server, or two or more computer servers. It should also be noted that the term "or" is generally employed in its sense including "and/or" unless the content clearly dictates otherwise.

The headings provided herein are for convenience only and do not interpret the scope or meaning of the embodiments.

Traditional user interface devices involve: visual, aural, and tactile modes of input and output. Haptic sensors are devices that measure one or more properties of an item (e.g., object, workpiece, article) through physical contact between the sensor and the item. Haptics sensors, e.g., tactile sensors, measure through contact properties including presence, shape, texture, temperature, hardness, moisture, etc. A haptic display, or haptic feedback device, is user interface device that conveys information to an item (e.g., part of body) through contact between the item and the haptic display.

Figure 1:
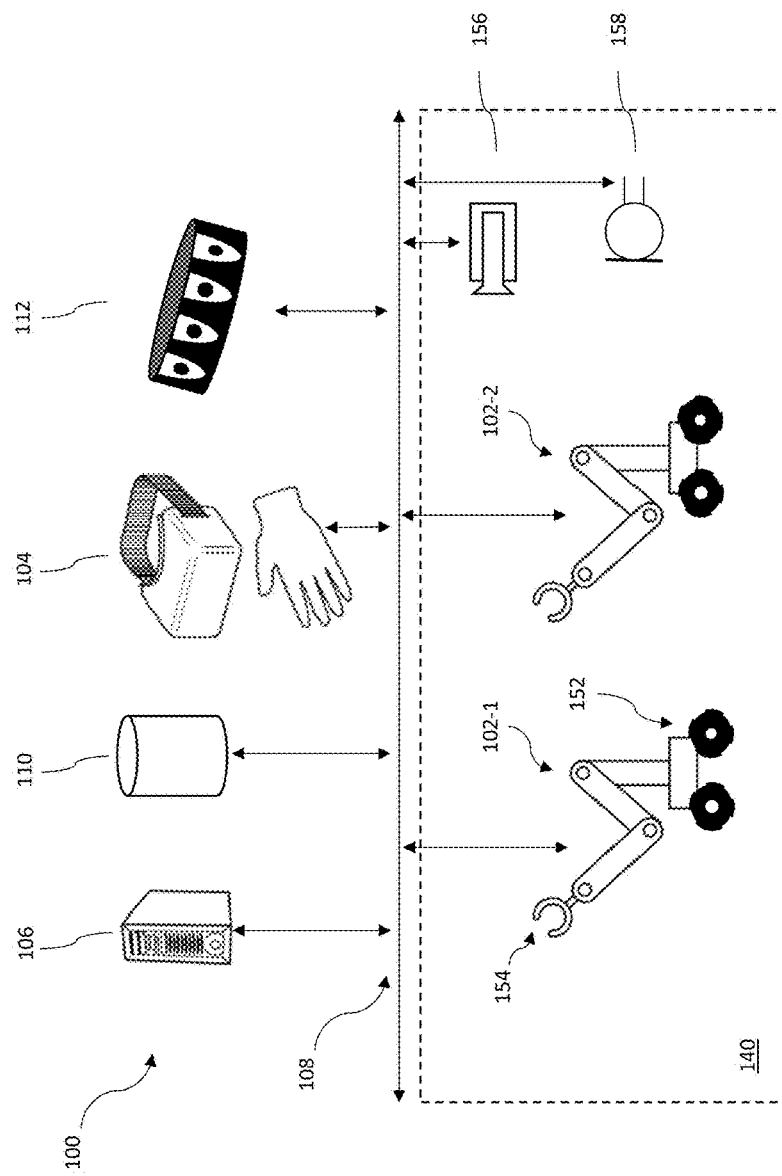
FIG. 1 is a schematic diagram illustrating a portion of a system including a robot, a user interface device.

FIG. 1 shows an exemplary system 100, including at least one processor based device, in accordance with the present system, devices, articles, and method. Various components of system 100 are optional. As shown, the system 100 includes one or more robots 102, an operator interface 104, and a computer 106, all communicatively coupled via one or more network or non-network communication channel 108. The system 100 can include at least one nontransitory computer- and processor-readable storage device 110 which stores processor-executable instructions and/or processor-readable data. The system 100 can include a user interface device 112. The user interface device 112 may be separate from, or part of, operator interface 104. Aspects and examples of the user interface device 112 are disclosed herein at and described in relation to, at least, FIGS. 5A, 5B, 6, 7, 8A-8F, 9, and 10.

Operator interface 104, a user interface, can include one or more user input devices, including those described herein, and one or more user output devices, for instance a display (e.g., LCD or OLED screen), head mounted display, and/or speaker. Examples, of computer 106 are described herein. Computer 106 may facilitate or coordinate the operator of system 100.

Examples of suitable network or non-network communication channel(s) 108 include a wire based network or non-network communication channel, optical based network or non-network communication channel, wireless network or non-network communication channel, or a combination of wired, optical, and/or wireless networks or non-network communication channels.

System 100 can include one or more robots 102-1, 102-2, and the like. A robot, like one of robot(s) 102, is an electro-mechanical machine controlled by circuitry and/or a processor following processor-executable instructions; a human operator controllable electro-mechanical machine; a robotic subsystem (or apparatus) of another machine including a robot; or the like. A robot performs physical tasks, for example, work with tangible results and/or computational tasks. A robot has the ability to move in a physical space, such as environment 140, to accomplish physical tasks. As well, a robot includes computational resources, on-board and/or remote computational resources, to perform computational tasks. The computational tasks can be in aid of the physical tasks, e.g., planning, as a task, for accomplishing a tangible result to one or more physical tasks. A robot has the ability to acquire information from sensors, e.g., on-board and/or remote sensor. A robot can be included in a larger system like system 100.

Robot(s) 102 operates in, and receives data about, an environment 140 that comprises a physical space. The term "about" is employed here in the sense of represent, characterize, or summarize. Robot(s) 102 may receive data from one or more sensors, such as, environmental sensors or internal sensors. Environmental sensors provide data that represents one or more aspect of the environmental conditions for the robots 102. Internal sensors provide data that represents information about the internal state of a robot. For example, the level of an internal battery, energy source, fuel cell, fuel, or the like. One or more of robot(s) 102 may be human operator controllable robots (i.e., piloted), autonomous robots, and hybrid robot (i.e., partially autonomous, partially piloted). A human operator at operator interface 104 may pilot at least one of the one or more of robot(s) 102. In operator controlled mode the human operator observes representations of sensor data—for example, video, audio or haptic data received from one or more environmental sensors or internal sensor. The human operator then acts, conditioned by a perception of the representation of the data, and creates information or executable instructions to direct the at least one of the one or more of robot(s) 102. Robot(s) 102 may operate in response to and/or by executing instructions generated or principally generated at an operator interface, for example, operator interface 104-2. For example, a robot, in piloted mode, would execute instructions that cause the robot to simulate actions taken by a human operator at an operator interface.

Alternatively a robot may act autonomously. Robot(s) 102 may operate in an autonomous mode executing autonomous control instructions. At least one processor, e.g., a processor in robot(s) 102 or computer 106, generates processor executable instructions, which when executed, cause at least one of robots 102 to act, e.g., move, manipulate an item.

Robot(s) 102 may be selectively operable in an autonomous mode, or operable in a piloted mode by a human operator via an operator interface. Robot(s) 102 may operate in a hybrid manner where the robot is in piloted mode for one or more tasks in a pipeline of tasks and is in autonomous mode for one or more tasks in the pipeline. Control of a robot can pass from autonomous mode to piloted mode (or the reverse) during a pipeline of tasks. A robot, like one of robot(s) 102, may operate in communication with network or non-network communication channel(s) 108. Robot(s) 102 may send to, and receive from, network or non-network communication channel(s) 108 processor readable data or processor executable instructions. Robot(s) 102 interact with one or more operator interfaces 104. Operator interface(s) 104 receive and send processor readable data or processor executable instructions across network or non-network communication channel(s) 108.

A robot typically includes a propulsion or motion subsystem comprising of one or more motors, solenoids or other actuators, and associated hardware (e.g., drivetrain, wheel(s), treads), to propel the robot in a physical space. An example of a motion subsystem is drivetrain and wheels 152. The space does not need to be horizontal or terrestrial. Examples of spaces include water, air, vertical spaces, outer space, and the like.

A robot includes a manipulation subsystem comprising one or more appendages, such as, one or more arms and/or one or more associated end-effectors. An end-effector is a device attached to a robotic arm designed to interact with the environment. End-effectors for robot operating in unstructured environments are devices of complex design. Ideally, these are capable of performing many tasks, including for example grasping or gripping or otherwise physically releasably engaging or interacting with an item. For example, the manipulation subsystem includes arm and end-effector 154.

While system 100 is illustrated with two of robots 102, one operator interface 104, one computer 106, and one user interface device 112, any of the various implementations can include a greater or lesser number of robots 102, operator interfaces 104, computers 106, and user interface device 112. A human operator at operator interface 104 may interact system 100 to navigate an avatar through a virtual environment (not shown).

Figure 2:
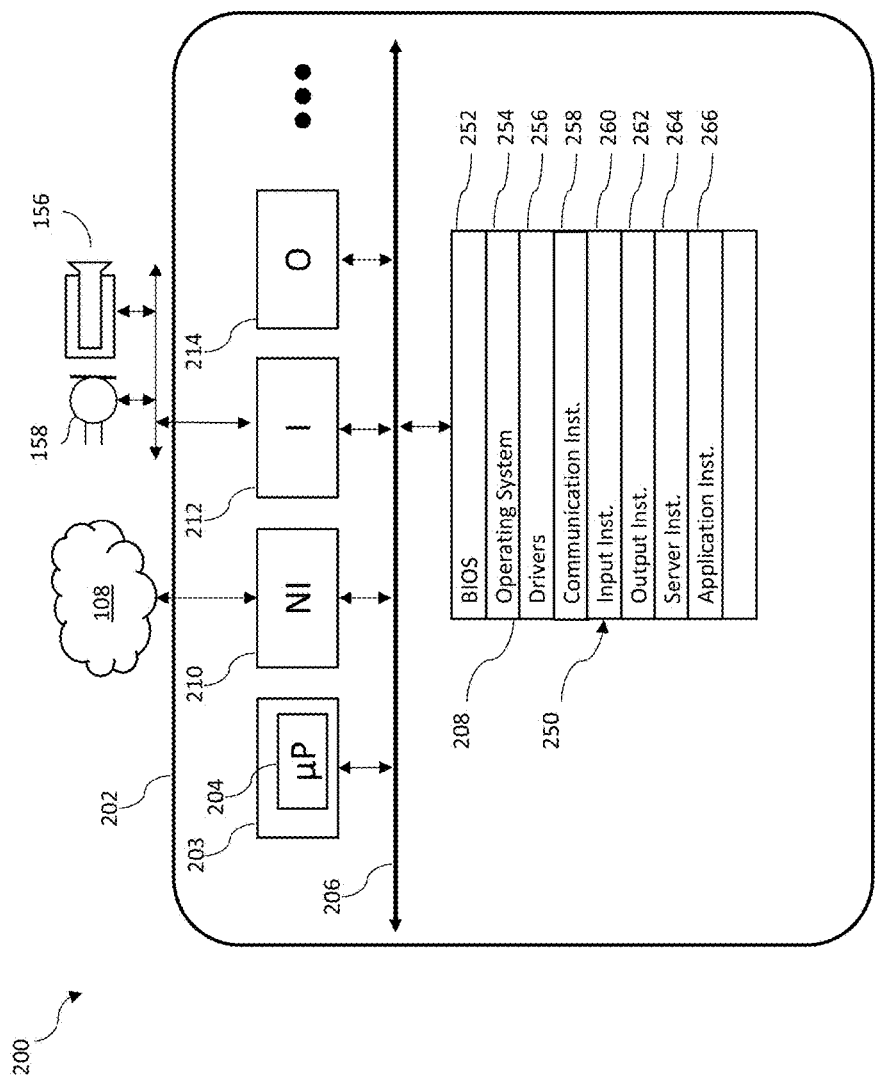
FIG. 2 is a schematic view illustrating an exemplary processor based device suitable for inclusion in the system of FIG. 1.

FIG. 2 schematically shows parts of a device, system 200, including at least one processor. System 200 includes at least one body or housing 202, and a control subsystem 203 that includes at least one processor 204, at least one nontransitory computer- and processor-readable storage device 208, and at least one bus 206 to which the processor(s) 204 and the storage device(s) 208 are communicatively coupled.

Processor(s) 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. Processor(s) 204 may be referred to in the singular, but may be two or more processors.

System 200 may include a network interface subsystem 210 that is communicatively coupled to bus(es) 206 and provides bi-directional communicative coupling to other systems (e.g., external systems to the system 200) via a network or non-network communication channel, such as, network or non-network communication channel(s) 108. The network interface subsystem 210 may include one or more buffers. The network interface subsystem 210 receives and sends data for system 200.

The network interface subsystem 210 may be any circuitry effecting bidirectional communication of processor-readable data, and processor-executable instructions. Suitable communication protocols include FTP, HTTP, Web Services, SOAP with XML, and the like.

System 200 includes an input subsystem 212. The subsystem 212 may include one or more user interface input devices, such as, a touch display, a keyboard, a mouse or other pointer device, a camera or other imagers 156, and a microphone 158. The input subsystem 212 may include one or more haptic sensors. In any of the implementations, input subsystem 212 can be coupled to the control subsystem 203 via the network interface subsystem 210. In any of the implementations, input subsystem 212 can include one or more sensors that measure conditions or states of a human, a user interface, a robot, and/or conditions in the environment to the human, user interface, or robot. Such sensors include cameras or other imagers (e.g., responsive in visible and/or nonvisible ranges of the electromagnetic spectrum including for instance infrared and ultraviolet), radars, sonars, touch sensors, pressure sensors, load cells, microphones, meteorological sensors, chemical sensors, or the like.

System 200 includes an output subsystem 214 comprising one or more output devices, such as, displays, speakers, and lights.

A person of ordinary skill in the art will appreciate the components in system 200 may be varied, combined, split, omitted, or the like. In any of the implementations, one or more of the network interface subsystem 210, input subsystem 212, and output subsystem 214 can be combined. Alternatively, in any of the implementations, one or more of the subsystems (e.g., input subsystem 212) can split into further subsystems. The bus(es) 206 can, for instance, take the form of a plurality of buses (e.g., data buses, instruction buses, power buses) included in at least one body.

The storage device(s) 208 is at least one nontransitory or tangible storage device. The storage device(s) 208 can include two or more distinct non-transitory storage devices. The storage device(s) 208 can, for example, include one or more a volatile storage devices, for instance random access memory (RAM), and/or one or more non-volatile storage devices, for instance read only memory (ROM), electrically erasable programmable read-only memory (EEPROM), Flash memory (i.e., selective EEPROM), magnetic hard disk (HDD), optical disk, solid state disk (SSD), and the like. A person of skill in the art will appreciate storage may be implemented in a variety of ways such as a read only memory (ROM), random access memory (RAM), a hard disk drive (HDD), a network drive, flash memory, digital versatile disk (DVD), any other forms of computer- and processor-readable memory or storage medium, and/or a combination thereof. Storage can be read only or read-write as needed. Further, systems like system 100 can conflate volatile storage and non-volatile storage, for example, caching, using solid-state devices as hard drives, in-memory data processing, and the like.

The storage device(s) 208 includes or stores processor-executable instructions and/or processor-readable data 250 associated with the operation of system 200, system 100, and the like. Herein the noun-phrases "processor-executable instructions and data", "instructions and/or data", and the like including conjunctions "and", "or", and "and/or" are employed in the sense of processor-executable instructions and/or processor-readable data.

The execution of the processor-executable instructions and/or data 250 cause the at least one processor 204 to carry out various methods and actions, for example via the output subsystem 214. The processor(s) 204 and/or control subsystem 203 can cause system 200 to carry out various methods and actions including, receive information, transform information, store information, and present information. Processor-executable instructions and/or data 250 can, for example, include a basic input/output system (BIOS) 252, an operating system 254, drivers 256, communication instructions and data 258, input instructions and data 260, output instructions and data 262, and application instructions and data 266.

Exemplary operating systems 254 include ANDROID™, LINUX®, and WINDOWS®. The drivers 256 include processor-executable instructions and data that allow control subsystem 203 to control circuitry of system 200. The processor-executable communication instructions and data 258 include processor-executable instructions and data to implement communications between system 200 and an operator interface, terminal, a system, or the like. The processor-executable input instructions or data 260 guide system 200 to process information received from sensors in input subsystem 212. The processor-executable input instructions and data 260 implement, in part, the methods described herein. The processor-executable output instructions or data 262 guide system 200 to provide information that represents, or produce control signal for effecting transformation of, information for display. The processor-executable server instructions or data 264, which when executed cause the system 200 to act a server for other processor based devices. The processor-executable application instructions and data 266, when executed, guide the system 200 in the instant application or task for system 200, system 100, or the like. Examples of applications include coordinating the operation of system 100, providing a virtual world, and the like. The processor-executable applications instructions and data 266 implement, in part, the methods described herein.

Figure 3:
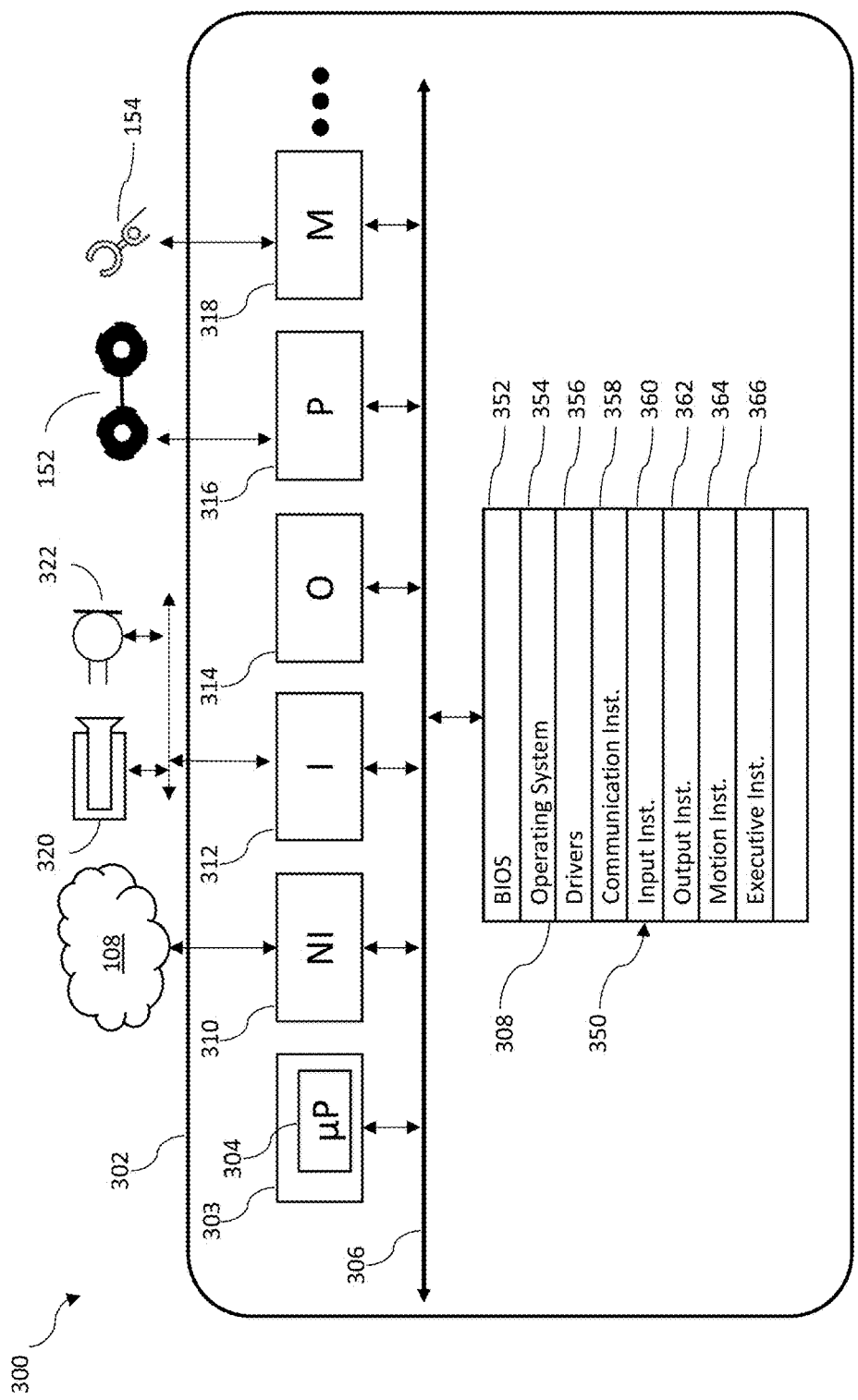
FIG. 3 is a schematic view illustrating an exemplary robot suitable for inclusion in the system of FIG. 1.

FIG. 3 illustrates an exemplary robot 300. As discussed herein, robots may take any of a wide variety of forms. FIG. 3 schematically shows parts of robot 300. Robot 300 includes at least one body 302, and a control subsystem 303 that includes at least one processor 304, at least one non-transitory computer- and processor-readable storage device 308, and at least one bus 306 to which the at least one processor 304 and the storage device(s) 308 are communicatively coupled.

The at least one processor 304 may be any logic processing unit. At least one processor 304 may be referred to in the singular, but may be two or more processors.

Robot 300 may include a network interface subsystem 310 that is communicatively coupled to bus(es) 306 and provides bi-directional communicative coupling to other systems (e.g., external systems external to the robot 300) via a network or communications channel, such as, network or non-network communication channel(s) 108. An example network is a wireless network. The network interface subsystem 210 may include one or more buffers. The network interface subsystem 310 receives and sends data for the robot 300. The network interface subsystem 310 may be any circuitry effecting bidirectional communication of processor-readable data, and processor-executable instructions.

Robot 300 includes an input subsystem 312. In any of the implementations, the input subsystem 312 can include one or more sensors that measure conditions or states of robot 300, and/or conditions in the environment to robot 300. Such sensors include cameras or other imagers 320 (e.g., responsive in visible and/or nonvisible ranges of the electromagnetic spectrum including for instance infrared and ultraviolet), radars, sonars, touch sensors, pressure sensors, load cells, microphones 322, meteorological sensors, chemical sensors, or the like. Such sensors include internal sensors, pressure sensors, load cells, strain gauges, vibration sensors, microphones, ammeter, voltmeter, or the like. In some implementations, the input subsystem 312 includes receivers to receive position and/or orientation information. For example, a global position system (GPS) receiver to receive GPS data, two more time signals for the control subsystem 303 to create a position measurement based on data in the signals, such as, time of flight, signal strength, or other data to effect a position measurement. Also for example, one or more accelerometers can provide inertial or directional data in one, two, or three axes.

Robot 300 includes an output subsystem 314 comprising output devices, such as, speakers, lights, and displays. The input subsystem 312 and output subsystem 314, are in communication with to the processor(s) 304 via bus(es) 306.

Robot 300 includes a propulsion or motion subsystem 316 comprising motors, actuators, drivetrain, wheels, and the like to propel or move the robot 300 within a physical space and interact with it. The propulsion or motion subsystem 316 propulsion or motion subsystem comprises of one or more motors, solenoids or other actuators, and associated hardware (e.g., drivetrain, wheel(s), treads), to propel robot 300 in a physical space. For example, the propulsion or motion subsystem 316 includes drive train 152. Propulsion subsystem 316 may move the at least one body 302 in an environment.

Robot 300 includes a manipulation subsystem 318, for example comprising one or more arms, end-effectors, associated motors, solenoids, other actuators, gears, linkages, drive-belts, and the like coupled and operable to cause the arm(s) and/or end-effector(s) to move within a range of motions. For example, the manipulation subsystem 318 includes one or more end-effectors described in relation to arm and end-effector 154. The manipulation subsystem 318 is communicatively coupled to the processor(s) 304 via bus(es) 306.

Components in robot 300 may be varied, combined, split, omitted, or the like. For example, robot 300 could include a pair of cameras (e.g., stereo pair) or a plurality of microphones. Robot 300 may include one, two, or three end-effectors in manipulation subsystem 318. In some implementations, the bus 306 is a plurality of buses (e.g., data buses, instruction buses, power buses) included in at least one body 302. For example, as part of a modular computing architecture where computational resources at distributed over the components of robot 300. That is in some implementations, a robot like robot 300, could have a processor in a left arm and a storage device in its thorax. In some implementations, computational resources are located in the interstitial spaces between structural or mechanical components of the robot 300. A data storage device could be in a leg and a separate data storage device in another limb. In some implementations, the computational resources distributed over the body include redundant computational resources.

The at least one storage device 308 is at least one tangible nontransitory storage device. The at least one storage device 308 includes or stores processor-executable instructions and/or processor-readable data 350 associated with the operation of robot 300, system 100, and the like.

The execution of the processor-executable instructions and/or data 350 cause the at least one processor 304 to carry out various methods and actions, for example via the motion subsystem 316 or the propulsion subsystem 318. The processor(s) 304 and/or control subsystem 303 can cause robot 300 to carry out various methods and actions including, receiving, transforming, and presenting information; moving in environment 140; manipulating items (e.g., objects, workpieces, articles); and acquiring data from sensors. Processor-executable instructions and/or data 350 can, for example, include a basic input/output system (BIOS) 352, an operating system 354, drivers 356, communication instructions and data 258, input instructions and data 360, output instructions and data 362, motion instructions and data 364, and executive instructions and data 366.

Exemplary operating systems 354 include ANDROID™, LINUX®, and WINDOWS®. The drivers 356 include processor-executable instructions and data that allow control subsystem 303 to control circuitry of robot 300. The processor-executable communication instructions and data 358 include processor-executable instructions and data to implement communications between robot 300 and an operator interface, terminal, a computer, or the like. The processor-executable input instructions or data 360 guide robot 300 to process input from sensors in input subsystem 312. The processor-executable input instructions and data 360 implement, in part, the methods described herein. The processor-executable output instructions or data 362 guide robot 300 to provide information that represents, or produce control signal that transforms, information for display. The processor-executable motion instructions or data 264, which when executed cause the robot 300 to move in a physical space and/or manipulate one or more items. The processor-executable motion instructions and data 264 may guide the robot 300 in moving within its environment via components in propulsion or motion subsystem 316 and/or manipulation subsystem 318. The processor-executable executive instructions and data 366, when executed, guide the robot 300 the instant application or task for system 200, system 100, or the like. The processor-executable executive instructions and data 266 guide the robot 300 in reasoning, problem solving, planning tasks, performing tasks, and the like.

Figure 4:
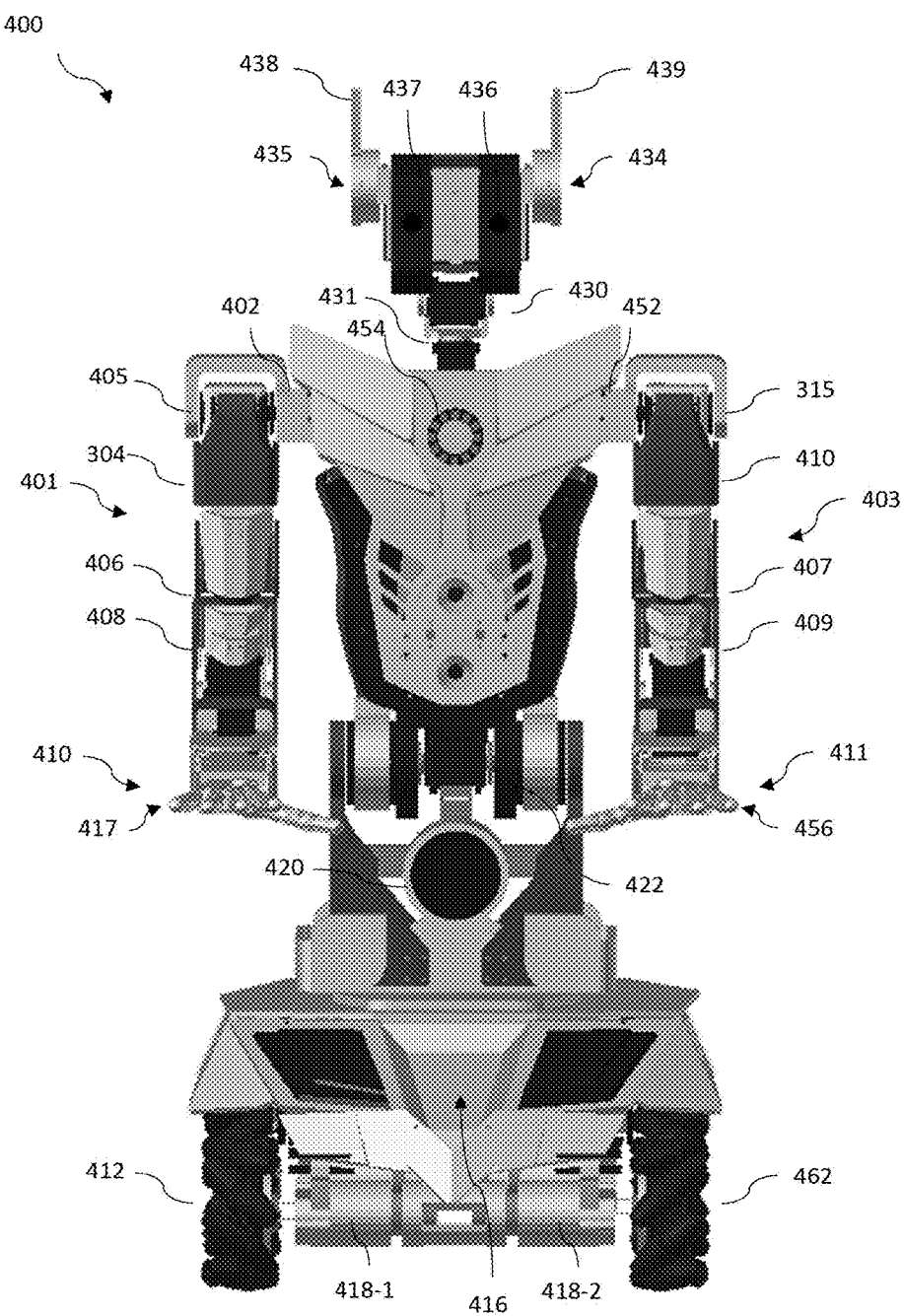
FIG. 4 is an elevational view illustrating an exemplary robot suitable for inclusion in the system of FIG. 1.
Figure 5:
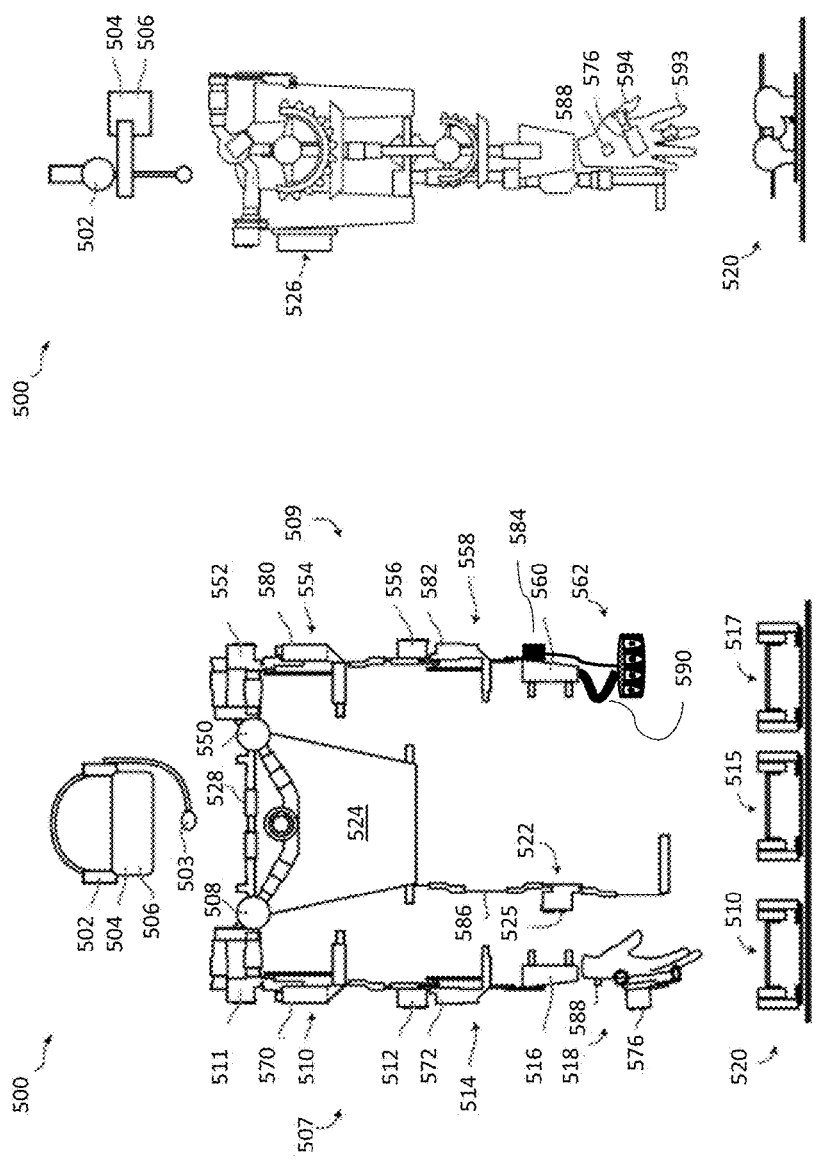
FIGS. 5A and 5B are a front elevational view and a right side elevational view, respectively, illustrating an exemplary operator interface suitable for inclusion in the system of FIG. 1.

FIG. 4 illustrates an exemplary robot 400. As discussed herein, robots may take any of a wide variety of forms. These include human operator controllable robots, autonomous robots, and hybrid robots. A robot comprises one or more bodies, also called structural components, or brackets. The bodies are coupled by joints, for example, bearings, and/or servo-motors. For example, a first body is connected to a second body by a servo or the like. It is possible to describe a robot in terms of the joints or the bodies. FIG. 4 is described in terms of the joints but a person of skill in the art will appreciate a body based description is possible.

Robot 400 may include a first arm 401 including one or more of shoulder servo 402, a shoulder servo 405, an elbow servo 406, a wrist servo 408, and end-effector 410. Robot 400 may include a second arm 403.

In various implementations, shoulder servos 402 and 405 may control and sense roll and pitch respectively of a shoulder included in the first arm 401. In some implementations, the shoulder servos 402 and 405 may, for example be DYNAMIXEL™ MX-28, MX-64, or AX-12 servo-motors produced by Robotis Co. Ltd. of Seoul, SK, although other electric motors or other actuators can be employed.

In some implementations, the shoulder yaw servo 404 may control and sense the yaw of the first arm 401. In various implementations, the shoulder yaw servo 404 may be a servo-motor like shoulder servos 402 and 405.

In some implementations, the elbow servo 406 may control and sense an elbow of the first arm 401. The elbow servo 406 may be a servo-motor like shoulder servos 402 and 405.

In some implementations, the first arm 401 includes a wrist servo 408 may control and sense rotation of an end-effector of the robot 400, e.g., end-effector 410. In some implementations, the wrist servo 408 maybe a servo-motor as described herein and including servos for shoulder servos 402 and 405.

In various implementations, the end-effector 410 may include a plurality of digits 417. For example, four fingers and a thumb are shown in FIG. 4. A thumb is generally regarded as a digit that may be used to oppose two more digits. In the case of an opposed pair of digits the thumb may be the short or less mobile digit. In some implementations, the digits of the end-effector 410 may include embedded force sensitive resistors. Respective servos, which may, for example be DYNAMIXEL™ XL-320 servo-motors or TOWERPRO™ hobby servos, may operate each digit independently, although other electric motors or other actuators can be employed. The end-effectors may, in some implementations, facilitate dexterous manipulation of items.

In some implementations, one or more digits of digits 417 of the end-effector 410 may have polymer filled internal and external structure and/or rubber pads proximate to the extremities of the one or more digits of digits 417. The material may, in operation enhance grip capacity of an end-effector and simulate the resistance of a human finger.

In some implementations, digits, such as digits 417, may each have one or more contact sensors and/or pressure sensors to sense pressure applied to the sensor and produce signals proportional to the pressure.

The second arm 403 may generally be similar to the first arm 401 but mirrored across a central vertical or sagittal plane of the robot. Referring to FIG. 4, the second arm 403, for example, includes a shoulder roll servo 452, a shoulder pitch servo 415, a shoulder yaw servo 413, an elbow servo 407, a wrist servo 409, and end-effector 411 including a plurality of digits 456.

In at least one implementation, the robot 400 includes one or more locomotion components comprising wheels, such as wheel pair 412 and wheel pair 462, an electronics compartment 416, DC motors 418-1 and 418-2, a speaker 420, a waist pitch servo(s) 422, an interlock 426 (to share torso support with waist pitch servo(s) 422), a single board computer (SBC) (not shown), one or more neck servos (e.g., two neck servos including a head pitch servo 430 and a head yaw servo 431), ear servos 434 and 435, cameras 436 and 437, microphones 438 and 439, lights/LEDs 454, and/or cable bundles (not shown).

In some implementations, wheel pair 412 and wheel pair 462 provide the capacity for locomotion to the robot 400. Wheel pair 412 and wheel pair 462 may provide a broad base which, in some examples, increases stability of the robot 400. In some implementations, the fore and aft wheel pairs 412 and 462 can include a additional wheels.

In other implementations, one or more treads can provide locomotion.

In various implementations for example, for example, include one or more on-board power sources, for instance housed in the electronics compartment 416. The on-board power sources can, for example, include one or more batteries, ultra-capacitors, and/or fuel cells, or arrays of the same, to independently power different components of the robot 300. Servos can, for instance, be powered by different respective batteries.

Exemplary batteries include secondary cells, for instance lithium polymer cells, for example, a 4000 mAh 3 cell 12 V battery; a 5 V 9600 mAh, USB mobile charging power pack; and a batter pack including one or more 3.7 V lithium ion batteries.

FIGS. 5A and 5B schematically show parts of operator interface 500 as an example of operator interface 104. FIG. 5A shows a front elevation view of the operator interface 500. FIG. 5B shows a side elevation view of the operator interface 500 shown in FIG. 5A. The operator interface 500 may include an operator interface processor, computer and processor readable storage device, display, potentiometers, speakers, a microphone, an inertial measurement unit ("IMU"), a haptic glove or manipulator interface, and an input/output ("I/O") interface, all of which are communicatively coupled (e.g., in communication with) the operator interface processor. As discussed above, in various implementations an operator interface generally similar to the operator interface shown in FIGS. 5A and 5B may include fewer, additional, or alternative sensors, actuators, and/or output devices to those of the operator interface 500 shown in FIGS. 5A and 5B.

The operator interface 500 includes left/right audio output 502, a microphone 503, left/right visual display 504, a head/neck motion sensor 406, and first and second arm sensor assemblies 507 and 509.

The first arm sensor assembly 507 includes a shoulder roll servo 508, a shoulder pitch servo 511, an upper-arm rotation capture device 510, an elbow servo 512, a lower-arm rotation capture device 514, a forearm mount or strap 516, and a manipulator interface or haptic glove 518. Second arm sensor assembly 509 may be generally similar to the first arm sensor assembly 507 but mirrored across a central vertical or sagittal plane of the operator interface 400. Second arm sensor assembly 509 includes a shoulder roll servo 550, a shoulder pitch servo 552, an upper arm rotation capture device 554, an elbow servo 556, a lower arm rotation capture device 558, a forearm mount 560, and a manipulator interface or end-effector interface 562.

Operator interface 500 includes a set of two or more locomotion pedals 520, such as, first, second, and third locomotion pedals 513, 515, and 517. The operator interface also includes a torso pitch interface 522 including an extension arm and a waist servo 525, a suit vest 524, an electronic back-box 526 and a chest/shoulder suit support structure 528.

In some implementations, the left/right audio output 502 may be implemented using speakers or headphones with speakers to provide an interface for receiving audio information from an operator controllable device, such as, one of robots 102, robot 300, or robot 400, to an operator using operator interface 500. In some implementations, the microphone 503 provides an interface for sending audio to an operator controllable device or may be used to voice to command interface.

The left and right visual displays 504 may provide an interface for displaying visual information captured by cameras for the operator controllable device, e.g., cameras 436 and 437. In some implementations, other visual information may also or alternatively be generated for display on the left and right displays 504. An example of generated information which may be displayed on the left and right visual display 504 is battery charge levels of the operator controllable device. In some implementations, the generated information includes a metric for a robot as determined by one or more observers. The left and right visual display 504 can be implemented by a virtual reality headset, such as, an OCULUS RIFT™, or ALTERGAZE™, available, respectively, from Oculus VR of Menlo Park, Calif., US; and Altergaze Ltd of London, UK.

The head/neck motion sensor 506 senses or captures movement of an operator's head, specifically pitch and yaw. In one implementation, the head/neck motion sensor 506 may include a gyroscope, an accelerometer, a magnetometer, and/or another inertial measurement unit (IMU). In various implementations, the head/neck motion sensor 506 is part of, e.g., built into, a virtual reality headset.

In various implementations, the shoulder roll servo 508 and the shoulder pitch servo 511 may sense or capture roll and pitch positioning of an operator's shoulder. In some implementations, the servos may include feedback resistors or potentiometers that provide signals representing servo position measurements. In some implementations, the shoulder servos 508 and 511 sense or receive information about and then simulate or replicate positions of corresponding shoulder servos in a robot, e.g., 402 and 405 respectively. In some implementation, these servos 508 and 511 are DYNAMIXEL™ AX-12 servos, although are not limited to such.

Referring still to FIGS. 5A and 5B, in various implementations, the upper arm rotation capture device 510 may sense or capture rotation of an upper arm of an operator. In some implementations, the upper arm rotation capture device 510 includes a first semi-circular gear mechanism that curls or wraps around the upper arm and couples with a second semi-circular gear mechanism at about 90 degrees to the first. In some implementations, the first and second semi-circular gear mechanisms cooperatively transfer the rotation of the upper arm to the rotation of a potentiometer 570 to the second gear mechanism. The potentiometer 570 may be centered around the second gear mechanism.

In some implementations, a non-moving part of the potentiometer physically couples to the operator's shoulder. In at least one implementation, the potentiometer has a wider than normal central shaft with a hole in the center. In some implementations, the potentiometer is, for example, a 39/20 mm Center Space Rotary Potentiometer.

In some implementations, the elbow servo 512 may capture or sense an angle of an operator's elbow. For example, in at least one implementation, the elbow servo 512 is a DYNAMIXEL™ AX-12. In some implementations, the elbow servo 512 simulates or replicates positions of the elbow servo of an operator controllable device, e.g., servo 406.

In some implementations, the lower arm rotation capture device 514 may capture or sense the rotation of the lower arm of the operator. In some implementations, lower arm rotation capture device 514 may operate generally similarly to the upper arm rotation capture device 510. The lower arm rotation capture device 514 includes a semi-circular gear mechanism that wraps around the lower arm and couples with a second semi-circular gear mechanism at 90 degrees to the first. This gear arrangement may transfer the rotation of the lower arm to the rotation of a potentiometer 572 centered around and connected to the second gear mechanism. In various implementations, a non-moving part of a potentiometer may be fixed to the operator's arm. The potentiometer 572 may, for example, be a 39/20 mm center space rotary potentiometer available from Panasonic Corp. of Osaka, JP, although other potentiometers can be employed.

In various embodiments, the forearm strap 516 may secure the first arm sensor assembly 507 of the operator interface 500 to the operator. In some implementations, the haptic glove 518 may capture or sense a position of the operator's pointer finger and thumb relative to one another. A servo 576 may be attached to the haptic glove 518 at the center point of rotation of the thumb and pointer finger of the operator. The angle of the servo may be controlled by two armatures 593 and 594 with rings allowing coupling of the operator fingers to the armatures. One armature is attached to the operator glove thumb 594 and the second armature is affixed to the operator glove pointer finger 593. In some implementations, the servo may be configured to provide feedback information garnered from an end-effector of the operator controllable device to the fingers of the operator using the operator interface 500 in the form of resistance as the operator guides the operator controllable device to pick up an item. In some implementations, the haptic glove 518 may use a DYNAMIXEL™ AX-12 servo.

The haptic glove 518 may have a vibrational device (e.g., vibrator) or buzzer 588, to vibrate with an amplitude or frequency that is a function of the signals coming from the finger pressure sensors of the haptic hand 510 of an operator controlled device, such as, robot 400. In some implementations, the amplitude or frequency may increase with increasing sensed pressure. The vibrational device 588 may be mounted on the back of the operator interface glove, or elsewhere on the haptic glove.

As discussed above, the second arm sensor assembly 509 mirrors and may be generally similar to the first arm sensor assembly 507. In some embodiments, the upper arm rotation capture device 554 includes a potentiometer 580, the lower arm rotation capture device 558 includes a potentiometer 582, and the manipulator interface 562. The manipulator interface 562, a user interface device, may include supporting electronics 584. The supporting electronics can include a power source, a comparator circuit, an analog to digital converter, and the like. In some implementations, the supporting electronics includes an ARDUINO MINI™.

In various embodiments, the forearm strap 560 may secure the second arm sensor assembly 509 of the operator interface 500 to the human operator. A strap 590 may secure manipulator interface 562 to forearm strap 560 or part of the second arm sensor assembly 509. A human operator can let go or drop the manipulator interface 562 and retrieve it directly or by pulling strap 590. In various embodiments, operator interface 500 may include one or two manipulator interfaces such as manipulator interface 562.

In some implementations, manipulator interface 562 may capture input from one or more digits of the operator. Manipulator interface 562 may include force sensitive resistors, or other force sensing devices, to measure forces exerted by the operator on the manipulator interface 562. Manipulator interface 562 may receive isometric input from the human operator. That is manipulator interface 562 does not substantially deform in response to exerted force and the exerted force is used to define the information content of an input signal. The human operator clasps or grips manipulator interface 562. Force sensors on or in manipulator interface 562 measure the extent of the grip and in response move part of a robot's end-effector, such as, an end-effector in arm and end-effector 154, manipulation subsystem 318, end-effector 410, or end-effector 411 found in one of robot(s) 102, robot 300, or robot 400.

In some implementations, manipulator interface 562 may provide feedback information garnered from an end-effector of the operator controllable device to the fingers of the operator using the operator interface 500. Such feedback includes vibration, counterforce, and the like. For vibrations manipulator interface 562 may include a rumble motor comprising a DC motor and eccentric mass attached to the motor's shaft. The rumble motor may be driven by a DC signal. Alternatively, the vibrator may be a vibrating mini motor disc from Adafruit Industries LLC of New York, N.Y., US.

In some implementations, an operator controls the locomotion pedals 520. An operator generally will selectively use one or both feet to move the pedals. The locomotion pedals 520 are arranged and tuned such that angles sensed or captured by the pedals control the motors 418 of the robot 400 and thus control locomotion of the robot 400. In some implementations, left and right forward motion pedals 517 and 513 may operate independently triggering left and right wheel pairs 462 and 412 respectively of the motility subsystem of the robot 400 and facilitate turning of the robot 400.

In some implementations, the locomotion pedals 520 may include a reverse motion pedal 515 configured to control both left and right wheel pairs 462 and 412 shown in FIG. 4. The three pedals may be fixed to a single rubber mat to prevent movement or sliding during use. In some implementations, each of the locomotion pedals 520 includes a rotating, pivoting, or swinging foot platform, a potentiometer to capture the angle of the foot platform, and a spring to return the pedal to a neutral position when the operator's foot is removed. The spring from a domestic mousetrap provides sufficient restorative force for the purpose.

In some implementations, the locomotion pedals 520 may include a pedal for the left drive train, a pedal for the right drive train, and a pedal for reverse. In some implementations, the left and right drive train pedals may provide signals which are combined to calculate a rotational and linear velocity of the operator controllable device.

In some implementations, a torso pitch interface 522 captures or senses how much an operator has bent forward by sensing the angle of the operator's torso relative to their hips or legs. An extension arm 586 on which a servo 525 is mounted may connect to the operator interface 500 by a hinge. In various embodiments, the extension arm may firmly connect to the operator's upper thigh. The waist servo 525 of the torso pitch interface 522 may, for example, be a DYNAMIXEL™ AX-12 servo.

In some implementations, the operator vest 524 may provide a mounting structure for components of the operator interface 500. The operator vest 524 may attach and anchor the operator interface 500 firmly to the operator's body.

In some implementations, the electronic back-box 526 may be attached to the vest 524 and may contain electronic components associated with the operator interface 500. In some implementations, the electronic back-box 526 may contain an ARDUINO PRO MINI™ which captures the sensor signals from the potentiometers 570, 572, 580, and 582 and controls mounted on the vest 524, power boards for the DYNAMIXEL™ bus, a power-breakout board which may also act as a patch panel including patching of the hand sensor signals and some ground pins, an ODROID™ which handles the wireless adapter for WIFI™ communication as well as a USB2AX, a Universal Serial Bus (USB) to Transistor-Transistor Interface (TTL) connector which allows the ODROID™ to send signals to the DYNAMIXEL™. The ODROID™ may also send signals to the ARDUINO PRO MINI™. The electronic back-box 526 may also contain an ARDUINO UNO™ configured to receive or capture position information from the pedals 520. Other computers, processors and/or boards may be employed. The ARDUINO PRO MINI™ microcontroller is available from Arduino LLC of Somerville, Mass., US. The ODROID™ computer, a processor-based device, is available from Hardkernel Co., Ltd. of Seoul, SK.

The chest/shoulder suit support structure 528 allows for suspension of operator interface suit items from the frame rather than from the operator's limbs. In various embodiments, the chest/shoulder suit support structure 528 may facilitate removal of the weight of the operator interface 500 off of the operator's arms onto the operators shoulder and back.

Figure 6:
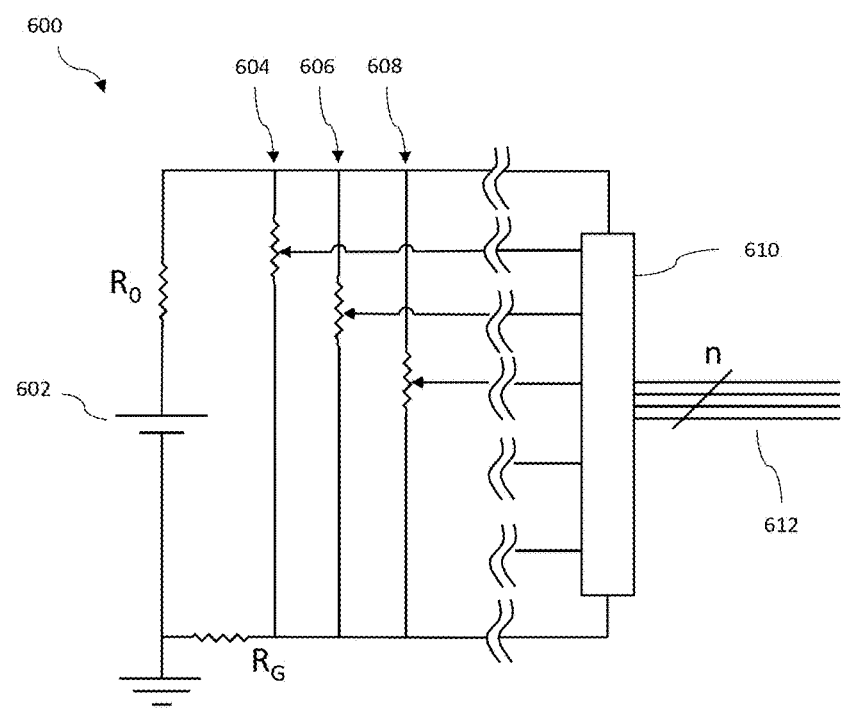
FIG. 6 is schematic view illustrating an example of user interface device suitable for inclusion in the system of FIG. 1.

FIG. 6 is a schematic view illustrating user interface device including partial circuit 600. Partial circuit 600 is an example of circuitry suitable for user interface device for use in system 100. Circuit 600 includes a power source 602 supplying voltage and current. In some embodiments, circuit 600 includes a plurality of resistors and other elements to create defined electrical potentials for various parts of circuit 600. For example resistors, such as, resistor $R_O$ or resistor $R_G$, are arranged as part of a voltage divider. A person of ordinary skill in the art would appreciate other arrangements of these circuit elements is possible.

Circuit 600 includes a plurality of variable resistors 604, 606, and 608. In some implementations, circuit 600 includes a force subsystem to measure force applied on a body in one or more locations. In some implementations, the force subsystem includes the plurality of variable resistors 604, 606, and 608. In some implementations, there are five variable resistors (only three illustrated in FIG. 6). In some implementations, variable resistors variable resistors 604, 606, and 608 are part of or model force sensors. For example, variable resistor 604 is force sensitive resistor which in response to an applied force reduces its resistance. Thus a mechanical action produces or at least varies an electric signal via variable resistor, such as, variable resistor 604. Examples of force sensitive resistors include INTERLINK 401 from ADAFRUIT INDUSTRIES, New York, N.Y., US; and FLEXIFORCE LOAD SENSORS (e.g., model A201) from TEKSCAN of Boston, Mass., US.

Circuit 600 includes a comparator 610 to measure voltage drops associated with one or more variable resistors 604, 606, and 608. In some implementations, the comparator is one or more high gain differential amplifiers. High gain differential amplifier may comprise an operational amplifier and plurality of resistors to provide feedback, account for non-idealities. In some implementations, comparator 610 is one or more analog to digital converters. In some implementations, comparator 610 includes a tangible digital output line 612 (e.g., line, bus, optical fiber) which carries thereon signals that represent input from a human operator. In some implementations, comparator 610 includes a tangible analogue output line, in addition to or in place of digital output line 612, which carries thereon signals that represent input from a human operator. Force sensors in circuit 600 measure the extent of a grip or inward force made by a human operator on a body, e.g., manipulator interface 562. A signal is produced in response to the measured force, such as digital signal in digital output line 612. The signal alone or in combination with processor executable instructions causes a robot's end-effector to move. In some implementations, the signal are used to cause the execution of processor executable instructions, the instructions cause the robot to move an end-effector. For example, an end-effector in arm and end-effector 154, manipulation subsystem 318, end-effector 410, or end-effector 411 found in one of robot(s) 102, robot 300, or robot 400. One force sensor can be associated with one or more digits of human operator and mapped to one or more parts of a robot's end-effector. In some cases two force sensors can be associated with one digit of human operator and mapped to one or more parts of a robot's end-effector.

Figure 7:
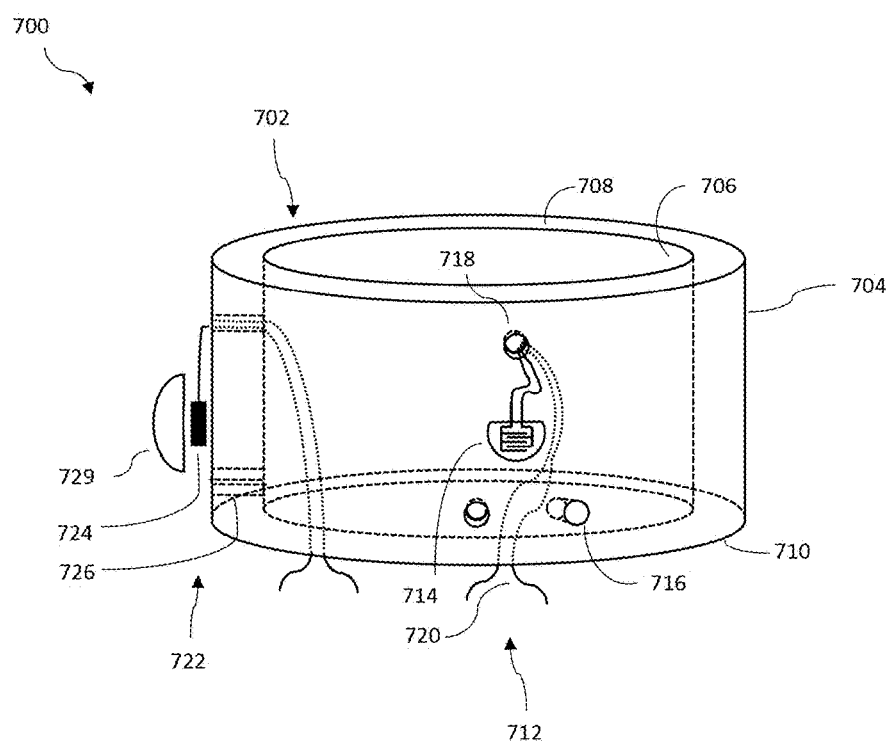
FIG. 7 is a perspective view illustrating a manufacture which is an example of the user interface device shown in, at least, FIGS. 5A and 5B.

FIG. 7 is a perspective (and partially exploded) view illustrating a manufacture which is an example of part of the manipulator interface 562 shown in FIGS. 5A and 5B. The manufacture 700 includes a body 702. The body may be rigid, for example, formed of metal, nylon, thermoplastic, wood, or the like. Body 702 is defined, in part, by an outer surface 704 with an outer periphery. Body 702 has a cylindrical shape. Outer surface 704 can be the outer surface of a cylinder, such as, a right circular cylinder. In some implementations, body 702 is defined, in part, by one or more of an inner surface 706, a top surface 708, and a bottom surface 710. In some implementations, outer surface 704 tapers in to top surface 708 or bottom surface 710. The body 702 can, for instance, take the form a conical section, which can be tubular including a wall which may have a closed inner surface 706 and a closed outer surface 704. The outer periphery of outer surface 704 is the extent of the body 702 in plan view.

The outer surface 704 (and/or body 702) is sized and shaped to be received by the hand of a human operator. The human operator may grip the outer surface 704 with two or more digits with one digit opposed to one or more other digits. For example, a thumb and two or more fingers may grasp body 702.

At a first location 712, a first force sensor 714 overlies the outer surface 704 of the body 702. First force sensor 714 is responsive to force applied to outer surface 704 in the direction of interior of body 702. For example, first force sensor 714 may be a force sensitive resistor which in response to a force applied in the direction of the interior of body 702 may exhibit a change, such as, decrease in resistance.

A button or body may overly first force sensor 714 and the body 702. An operator can press the button. One or more passages or holes may be defined in or in and through body 702. For example, one or more holes, such as hole 716, may be positioned near the first location 712 to receive a strap to attach the body 702 to a human operator's finger. The strap may be anchored on the interior of body 702 or in body 702. In some implementations, one or more holes, such as hole 718, may be positioned near the first location 712 to part of a circuit, such as, wires 720 to pass from the first force sensor 714 to a comparator circuit. Examples of a comparator circuit include an analog to digital converter, such as, found in an ARDUINO PRO MINI™.

At a second location 722, a second force sensor 724 overlies the outer surface 704 of the body 702. Second force sensor 724 is responsive to force applied to outer surface 704 in the direction of an interior of body 702, for instance in a radially inward direction for a conical or tubular body 702. One or more passages or holes, such as hole 726, may be defined in or in and through body 702 to provide straps or routing for one or more circuits. A button or body 729 may overlie the second force sensor 724 and the body 702. Button 729 may have a convex shape on its outwardly facing side or face. The outwardly facing side or face of button 729 may be flat. The outwardly facing side or face of button 729 may be concave.

The first location 712 and second location 722, and associated force sensors are spaced around the body 702. First location 712 and second location 722 are spaced apart and opposed to each other. That is when a human operator grips the body 702 the force sensors 714 and 724 measure an inward force from the human operator's grip on body 702. A signal is produced in response to the measured force, such as digital signal, which may represent a level of force applied or detected by the respective force sensor. The signal indirectly or directly causes a robot's end-effector to move. For example, an end-effector in arm and end-effector 154, manipulation subsystem 318, end-effector 410, or end-effector 411 found in one of robot(s) 102, robot 300, or robot 400. The force sensors may resist the inward force and thus the signal that causes a robot's end-effector to move comes from isometric input.

Manufacture 700 may include further force sensors. Each force sensor may be at an additional location that is spaced apart from other force sensors and opposed to the first force sensor. Each force sensor may be placed or disposed on an opposite side of body 702 such that a force exerted by a first part of an operator's hand is counterbalanced, counteracted, or resisted by a force applied by a second part of the operator's hand. That is, the manufacture 700 may receive isometric input from the human operator.

Each force sensor can be associated with one or more digits of human operator and logically mapped to one or more parts of a robot's end-effector, for instance via one or more logic circuits or tables. In some cases two force sensors can be associated with one digit of human operator and mapped to one or more parts of a robot's end-effector.

In some implementations, manufacture 700 may include one or more circuits which in response to a signal provide feedback for a human operator holding the manufacture 700. Manufacture 700 may include a rumble motor comprising a DC motor and eccentric mass attached to the motor's shaft. The rumble motor may be driven by a DC signal. Alternatively, a vibrating mini motor disc from ADAFRUIT INDUSTRIES. The rumble motor or vibrating mini motor disc may be affixed to the body 702.

FIGS. 8A through 8F are plan views illustrating exemplary shapes or cross-sectional profiles for a manufacture in accordance with present invention. Body 702 of FIG. 7 is defined in part by an outer surface 704, and, as illustrated there, the outer periphery of the outer surface 704 has a circular shape. That is, in plan view of outer surface 704 includes a curve of constant radius. However manufacture in accordance with present disclosure can include an outer periphery with a variety of shapes.

Figure 8A:
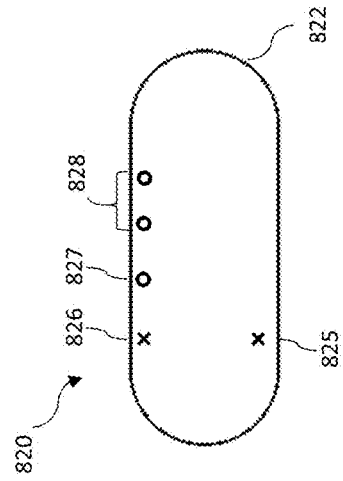
FIGS. 8A-8F are plan views illustrating exemplary shapes for a manufacture.

FIG. 8A shows in plan view a body 800 defined in part by an outer periphery 802 with an oval shape. An oval is a shape reminiscent of an avian egg. The oval can be constructed by using arcs of constant radius and joining these arcs at the point adjacent arcs share a tangent.

Figure 8B:
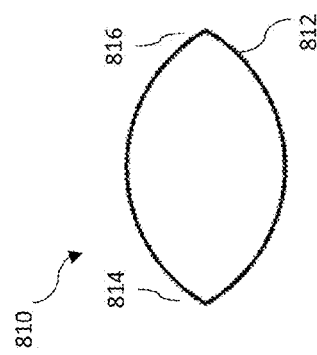

FIG. 8B shows in plan view a body 810 defined in part by outer periphery 812 with vesica piscis shape. The vesica piscis, is a shape that is defined by the intersection of two circles. Commonly these have equal radii but for a manufacture in accordance with this disclosure the radius of the first circle may be dissimilar to the radius of the second circle. The intersection of the circles defines two vertices 814 and 816. The vertices 814 and 816 may be blunted. The vesica piscis shape may be referred to as a lens, a football, marquise cut, and the like.

Figure 8C:
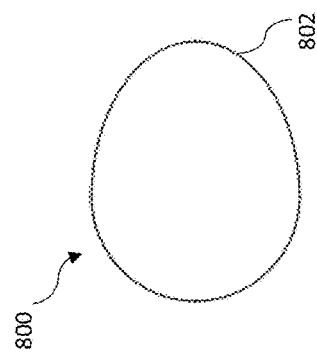

FIG. 8C shows in plan view a body 820 defined in part by an outer periphery 822 shaped as a stadium. The stadium, track, obround, or discorectangle, is a two-dimensional geometric shape constructed of a quadrilateral mated with a first semicircle on a first side, and a second semicircle mating with a second side. When the quadrilateral is a rectangle the semicircles share the same radius. The shape resembles a running track. Body 820 includes a plurality of locations for force sensors. A first location 824 may be positioned where an operator would place a thumb. A second location 826 may be positioned where an operator would place a forefinger or another finger. Third location 827 is an optional location to receive an additional finger, such as a middle finger. Fourth and fifth location 828 are optional locations to optionally receive or two additional fingers. Some robots lack a fifth finger and input from the little finger is superfluous. Some operators lack strength in their little finger and the input for the little finger can be combined with input from the neighboring finger.

Figure 8D:
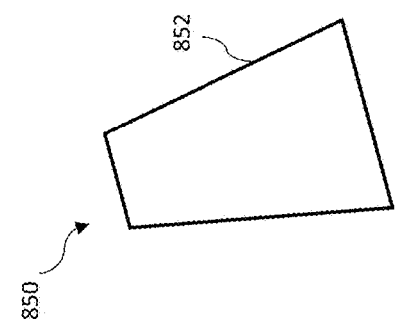

FIG. 8D shows in plan view a body 830 defined in part by an outer periphery 832 with an arch shape. An example of an arch is shape defined by a quadrilateral mated on one side with a closed form, such as, a semicircle, triangle, and the like. The combination of a rectangle and a semicircle is a classic arch. Alternative arches have a flat end, two side extending upward and inward and joining at an extreme point such as an acute vertex.

Figure 8E:
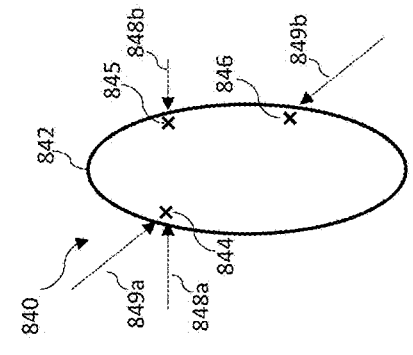

FIG. 8E shows in plan view a body 840 defined in part by an outer periphery 842 with an elliptical shape. An ellipse is two dimensional shape defined by a path where each point on the path is spaced apart from a first focal point by a first distance and a second focal point by a second distance, and where the sum of the first and second distances is constant.

Body 840 includes a first location 844 on or at the outer periphery 842 and a pair of exemplary opposed locations also on outer periphery 842: location 845 and location 846. First location 844 and second location 845 are opposed a force applied or exerted at the first location can be counteracted, counterbalanced, or resisted by a force applied second location 845. For example, force 848*a* may counteract force 848*b*. The forces may be equalizes, that is, equal magnitude and opposite directions. For example, force 849*a* may equalize force 849*b*.

Location 844 and location 845 are symmetrically opposed with respect an axis of symmetry, for example, the major axis of the illustrated section of body 840. Location 844 and location 845 have bilateral or reflection symmetry. A pair locations may diametrically opposed that is opposed with respect two axes of symmetry, for example, the major axis and the minor axis of the illustrated section of body 840. A pair locations that are diametrically opposed may have 180 degree rotational symmetry.

Figure 8F:
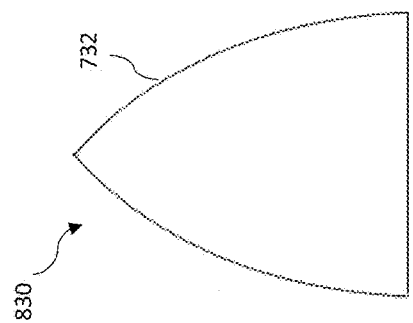

FIG. 8F shows in plan view a body 850 defined in part by a trapezoidal outer periphery 852. The trapezoid may be a rectangle, a square, a rhombus, a parallelogram, or a general trapezoid.

Figure 9:
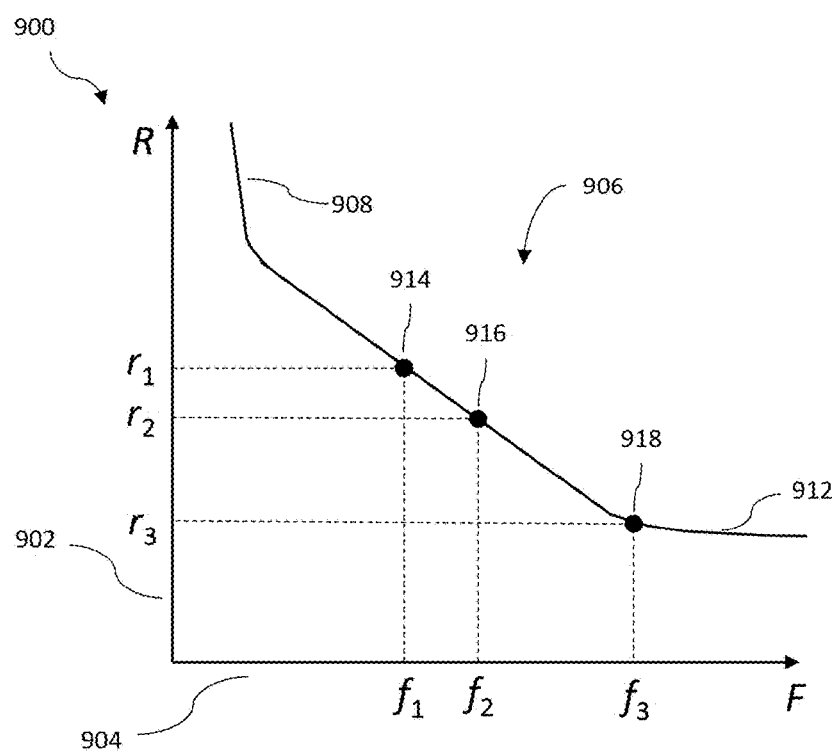
FIG. 9 is a plot illustrating a response curve of a force sensitive resistor.

FIG. 9 is a plot 900 illustrating a response curve of a force sensitive resistor an example of a force sensor. The plot 900 shows resistance of a force sensitive resistor plotted against applied force. Plot 900 includes axis 902 for resistance and axis 904 for force. Resistance may be measured in ohms and force in newtons. The axis 902 may span from zero newtons to hundreds of newtons. The axis 904 may span from hundreds of ohms to tens of kilohms. Either or both of axis 902 and axis 904 can be logarithmic. Plot 900 includes response curve 906. Response curve 906 may represent a resistance value of a force sensitive resistor for a given force applied to the force sensitive resistor. Response curve 906 can be used to calibrate a user interface device that includes one or more force sensitive resistors. Each sensitive resistor of the one or more sensitive resistors may have its own response curve and associated calibration.

Response curve 906 has a neck region 908 where the resistance value is proportional to force with a negative gain of a large value. That is, small changes in force lead to large decreases in resistance. Response curve 906 has an operating region 910 where the resistance is proportional to force with a negative gain. A linear response may characterize the operating region 910. Response curve 906 has a saturation region 912. In region 912 increases in force lead to small or even imperceptible decreases in resistance.

In plot 900, for illustrative purposes, there are three points 914, 916, and 918 on response curve 906. Each point is a force-resistance pair. Point 914 is associated with a first resistance value $r_1$ and a first force $f_1$. Points 916 and 918 are associated with a second and third resistance and force pairs: $r_2$, $f_2$; and $r_3$, $f_3$. In some implementations, point 914 defines a boundary of an active region. If an operator imparts a force, such as gripping manipulator interface 562, that is greater than the first force value the resistor provide a resistance below the first resistance. A user interface device could treat the first force-resistance pair (point 914) as a threshold for input. As the operator presses or grips harder or other imparts greater for on the force sensitive resister the user interface interprets the force as a greater input value.

In some implementations, point 918 define an active region. If an operator imparts a force less than the third force value, the resistor provides a resistance above the first resistance. A user interface device could treat the third force-resistance pair (point 918) as an upper limit for input. Below the third force value, when the operator applies a greater force, the user interface device interprets such as a greater input value.

In some implementations, point 914 and point 918 define an active region with a threshold and an upper limit. In some implementations, point 916 defines a threshold value for binary input. The user interface interprets all forces to one side of the second force-resistance pair as the same input.

Figure 10:
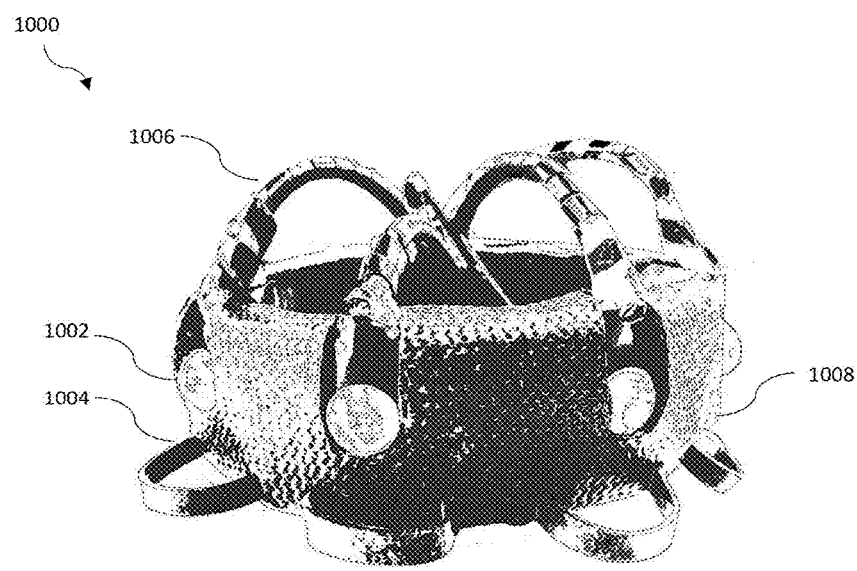
FIG. 10 is an inverted perspective view illustrating the manufacture shown in at least FIG. 7.

FIG. 10 is a perspective view illustrating a manufacture 1000. Manufacture 1000 is an example of manipulator interface 562 and/or user interface device 112. Manufacture 1000 may include the manufacture 700 within. Manufacture 1000 is an inverted view compared to views in FIGS. 1, 5, and 7.

In one or more locations on manufacture 1000 are force sensors. Buttons, such as button 1002, overlies the force sensor. A human operator can push on the buttons to provide input. A strap, such as strap 1004, can be attached to manufacture 1000. A strap may be positioned near each force sensor to snag or otherwise engage a respective finger, allowing a human operator to hold manufacture 1000 more easily. The strap may be flexible or elastomeric. Elastomeric straps in a relaxed or moderately strain state can be in a close fit engagement with holes within a body. In a high strain state the elastomeric states may freely move along the holes. Thus elastomeric straps allow for straps that are easily resizable.

Manufacture 1000 may receive isometric input from a human operator. The human operator grasp manufacture with two or more digits and applies variable force. In response to the force, force sensor may generator or produce signals sent via tangible carriers such as wires, cables, fiber optic, and the like. An example of a tangible carrier is wire bundle 1006 that passes from the force sensor in the interior of manufacture 1000 and on to supporting electronics such as an ARDUINO MICRO™.

Manufacture 1000 may be covered in a non-slip or cushioning material 1008. For prototyping, non-slip material for use in kitchens and available form hardware stores was found effective.

In some implementations, a manufacture 1000 may be about 85 mm in diameter, about 22 mm in height and about 6 mm in thickness between inner and outer walls. Here about means within plus or minus 20%. In some implementations, a manufacture 1000 may be about or less than 150 mm in diameter. In some implementations, manufacture 1000 may be about than 70 mm in diameter corresponding to a comfortable size for many people to grip.

Figure 11:
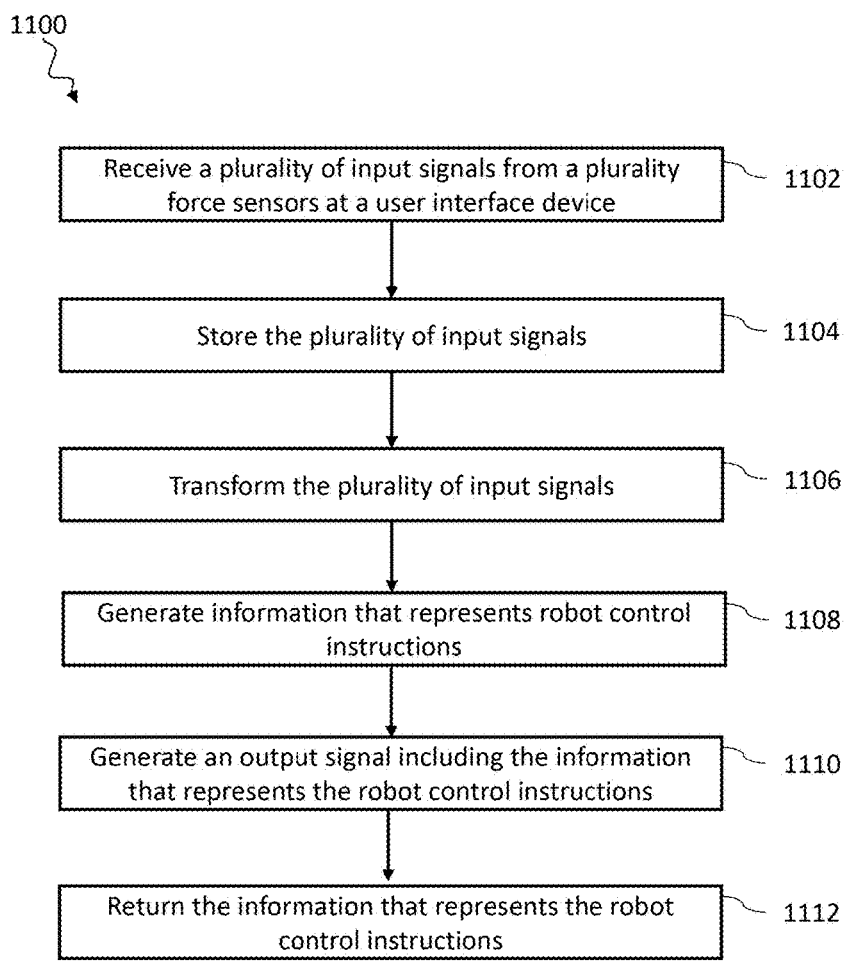
FIG. 11 is a flow-diagram illustrating an implementation of a method of operation for of a system including a user interface device.

FIG. 11 shows method 1100 executable by a controller, such as circuitry or at least one hardware processor, for operation in a robotic system. Method 1100, in part, describes how a controller may receive input from a user interface and cause part of a robot to a pose conditioned on the input. Those of skill in the art will appreciate that other acts may be included, removed, and/or varied or performed in a different order to accommodate alternative implementations. Method 1100 is described as being performed by a controller, for example, a control subsystem or processor(s) in computer 106 or system 200, in conjunction with other components, such as those found in, system 100, computer 106, system 200, robot 300, robot 400, operator interface 500, manufacture 700, and manufacture 1000. However, method 1100 may be performed by multiple controllers or by another system.

For performing part or all of method 1100, the controller may be at least one hardware processor. A hardware processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The hardware processor may be referred to herein by the singular, but may be two or more processors. The hardware processor(s) may, for example, execute one or more sets of processor-executable instructions and/or data stored on one or more nontransitory processor-readable media. For performing part or all of method 1200 one or more robots may be included in the operation of a robotic system. Exemplary robots are described herein.

Method 1100 begins, for example, in response to an invocation by the controller.

At 1102, the controller receives a plurality of input signals from a plurality force sensors at a user interface device, e.g., user interface device 112, in communication with the controller. The user interface device may include a body, e.g., tubular body, with an outer surface of the body and the plurality force sensors disposed over or on or underlying the outer surface. In response to a force exerted, for example by a hand of an operator, the plurality force sensors produce the plurality of input signals. The plurality force sensors may include circuit 600 or operate in accordance to response curve 906. The user interface device may be included in a larger interface, e.g., manipulator interface 562 in operator interface 500.

The plurality of input signals may include processor-readable input information that represents one or more forces applied to the force sensors at the user interface device. The processor-readable input information may represent a pose for one or more appendages or digits of a human operator.

At 1104, the controller may store processor-readable input information that represents one or more forces applied to the force sensors at the user interface device on a computer- and processor-readable storage device.

At 1106, the controller may transform the plurality of input signals. For example, the controller may aggregate the plurality of input signals as spread across a plurality of frequencies, a plurality of packets, or the like. The controller may, in whole or part, check for errors, decrypt, or decode the plurality of input signals.

At 1108, the controller creates processor-readable information that represents processor-executable robot control instructions which when executed causes the robot to assume a pose. For example, the robot may simulate at least one action taken by the operator, e.g., operator at the user interface device.

At 1110, the controller generates an output signal including the information that represents the robot control instructions.

At 1112, the controller returns the information that represents the robot control instructions. For example, the controller causes the output signal to be transmitted through a network or non-network communication channel, or uses the signal to update a computer- and processor-readable storage device with the information that represents the robot control instructions.

Method 1100 ends until invoked again.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art. The teachings provided herein of the various embodiments can be applied to many computer systems, robotic systems, and robots, not necessarily the exemplary computer systems, robotic systems, and robots herein and generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or virtually any combination thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure.

As used herein processor-executable instructions and/or processor-readable data can be stored on any non-transitory computer-readable storage medium, e.g., memory or disk, for use by or in connection with any processor-related system or method. In the context of this specification, a "computer-readable storage medium" is one or more tangible non-transitory computer-readable storage medium or element that can store processes-executable instruction and/or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory storage media.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. Aspects of the embodiments can be modified, if necessary, to employ systems, circuits, devices, methods, and concepts in various patents, applications, and publications to provide yet further embodiments.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A manufacture for inclusion in a user interface device comprising:
a first tubular body including an outer surface;
a first force sensor overlying the outer surface of the first tubular body at a first location; and
a second force sensor overlying the outer surface of the first tubular body at a second location opposed to the first location.

2. The manufacture of claim 1 further comprising:
a third force sensor overlying the outer surface of the first tubular body at a third location opposed to the first location and spaced away from the second location; and
a fourth force sensor overlying the outer surface of the first tubular body at a fourth location opposed to the first location and spaced away from the second location and the third location.

3. The manufacture of claim 1 further comprising:
a second body overlying the first force sensor or the second force sensor where the first force sensor or the second force sensor is responsive to a force applied to the second body in the direction of the first tubular body.

4. The manufacture of claim 3, wherein:
the second body is defined by at least one boundary having a shape selected from the group consisting of: convex shape, concave shape, and flat shape.

5. The manufacture of claim 1 further comprising:
a partial circuit, communicatively coupled to the first force sensor, which in response to a signal generated at the first force sensor carries the signal along the partial circuit.

6. The manufacture of claim 1 wherein the first tubular body is sized, and the first location and the second location are spaced apart to receive a thumb and a finger from a human operator.

7. The manufacture of claim 1 wherein the outer surface includes an outer periphery has a shape selected from the group comprising: circle, oval, vesica piscis, stadium, arc, ellipse, and quadrangle.

8. The manufacture of claim 1 wherein the first force sensor is a force sensitive resistor.

9. The manufacture of claim 1 wherein the first location is diametrically opposed to the second location.

10. The manufacture of claim 1, further comprising a strap coupled to the first tubular body proximate at least one of the first and second force sensors, the strap operative to engage at least one finger of a human operator during use.

11. The manufacture of claim 1 wherein the outer surface is sized and shaped to be received by a hand of a human operator.

12. The manufacture of claim 1, further comprising first and second straps coupled to the first tubular body, each of the first and second straps is positioned proximate a respective one of the first and second force sensors and is operative to engage at least one finger of a human operator during use.

13. A robotic system, comprising:
at least one processor;
a robot communicatively coupled to the at least one processor;
an operator interface communicatively coupled to the at least one processor and the robot, the operator interface including:
   a tubular body defined in part by an outer surface to receive a hand of an operator, and
   a plurality of force sensors overlying the outer surface of the tubular body which are responsive to an inward force exerted by the hand of the operator produces a plurality of input signals, and wherein a pair of force sensors of the plurality force sensors are spaced apart and opposed to receive a thumb and a finger of the operator; and
at least one non-transitory computer-readable storage medium communicatively coupled to the at least one processor and which stores processor-executable instructions thereon which when executed cause the at least one processor to:
   receive the plurality of input signals,
   create robot control instructions which when executed by the robot, cause the robot to simulate at least one action taken by the operator, and
   produce at least one signal that represents the robot control instructions.

14. The system of claim 13 further comprising:
a partial circuit, communicatively coupled to the plurality of force sensors, which in response to input information generated at the plurality of force sensors carries the input information along the partial circuit.

15. The system of claim 13 wherein the outer surface includes an outer periphery has a shape selected from the group comprising: circle, oval, vesica piscis, stadium, arc, ellipse, and quadrangle.

16. The system of claim 13 wherein at least one force sensor in the plurality force sensors includes a force sensitive resistor.

17. The system of claim 13 wherein, when executed, the processor-executable instructions further cause the at least one processor to:
   transmit at least one signal that represents the robot control instructions through a communication channel.

18. The system of claim 13 wherein the operator interface further comprises a strap coupled to the tubular body proximate at least one of the plurality of force sensors, the strap operative to engage at least one finger of the operator during use.

19. The system of claim 18 wherein the strap is at least one of flexible or resizable.

20. The system of claim 13 wherein the operator interface further comprises a plurality of straps coupled to the tubular body, each of the plurality of straps is positioned proximate to one or more of the plurality of force sensors and is operative to engage at least one finger of the operator during use.

* * * * *